No. 696,273. Patented Mar. 25, 1902.
J. ROGER.
CONVEYER.
(Application filed May 23, 1901.)
(No Model.)
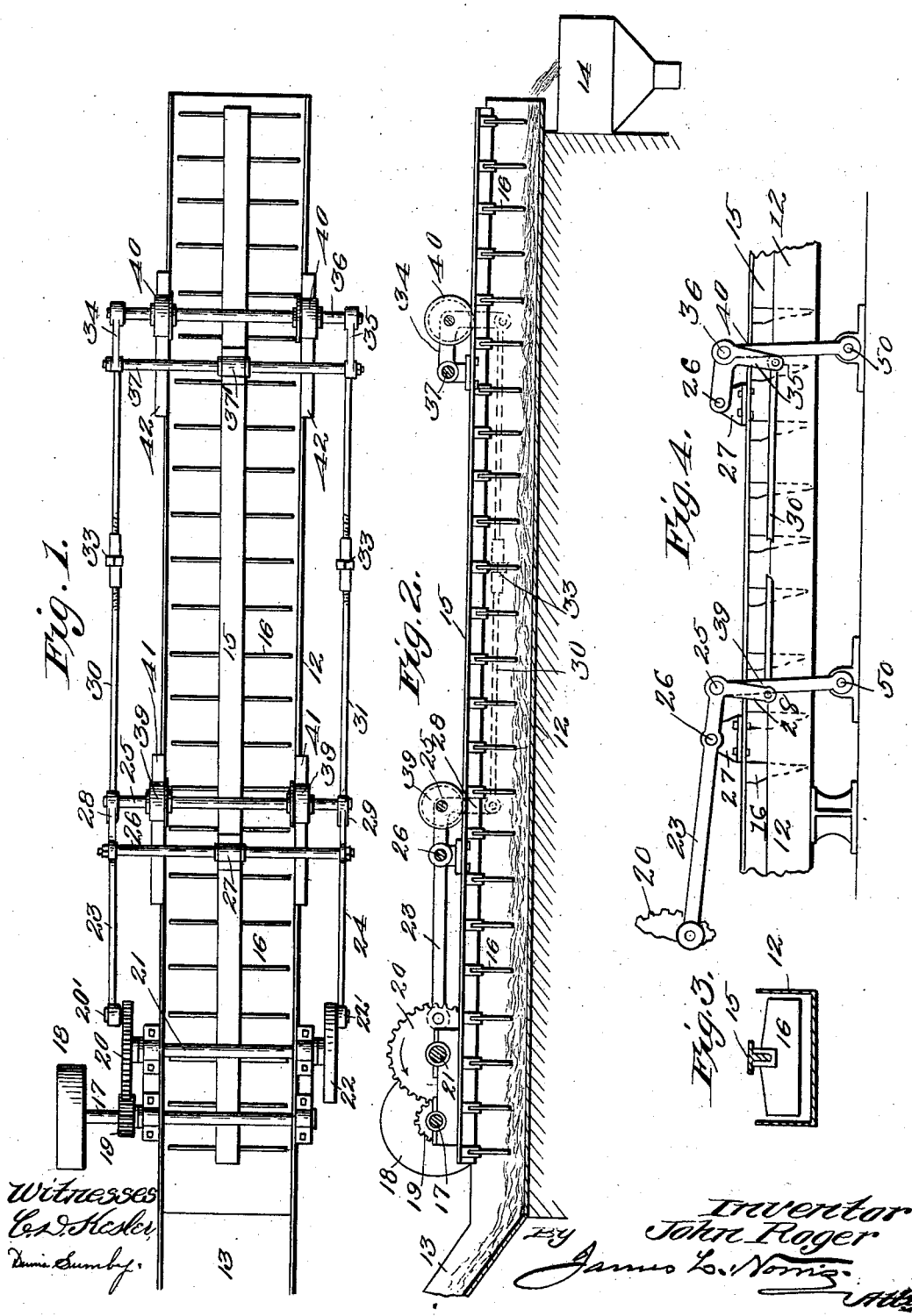
Witnesses
Inventor
John Roger

UNITED STATES PATENT OFFICE.

JOHN ROGER, OF DENVER, COLORADO.

CONVEYER.

SPECIFICATION forming part of Letters Patent No. 696,273, dated March 25, 1902.

Application filed May 23, 1901. Serial No. 61,606. (No model.)

*To all whom it may concern:*

Be it known that I, JOHN ROGER, a subject of the King of Great Britain, residing at Denver, in the county of Arapahoe and State of Colorado, have invented new and useful Improvements in Conveyers, of which the following is a specification.

This invention relates to a conveyer, and although it is not limited in its application for use in connection with any particular sort of material I find it of decided utility as a means for handling ore or hot material, and the conveyer is simple in construction and thoroughly efficient in operation.

The improved conveyer in the form thereof illustrated in the accompanying drawings, forming a part of this specification, includes in its organization a longitudinal body, which may be a girder of suitable cross-sectional shape (the T kind being very convenient for this purpose) having a plurality of depending hoes, preferably rigidly connected with said body and which are adapted to work in a trough fixed against movement, means being provided to move said body through an orbital path, whereby the hoes therein can push the substance in said trough either forward or backward.

The invention also includes other features, which, with the foregoing, will be hereinafter set forth at length, while the novelty will form the basis of the appended claims.

In the drawings, Figure 1 is a plan view of a conveyer involving my present improvements in one simple form thereof. Fig. 2 is a side elevation of the same. Fig. 3 is a transverse section. Fig. 4 is a side elevation showing a different means for guiding the orbitally-reciprocative body.

Like characters refer to like parts in all the figures of the drawings.

Referring now to the drawings, the numeral 12 indicates a trough, which may be of any suitable material and of any desirable length, said trough being fixed and being adapted to contain the material which is to be conducted from one point to another. The material can be supplied to the trough anywhere along the same, or it may be passed to the same through the chute 13 (shown as situated at the left end of the same) for delivery into the hopper 14 at the right of said trough.

A bar is shown at 15, and it is mounted for movement in an elliptical path, and it is provided with a series of substantially equidistantly-disposed depending hoes, as 16, the length of which is slightly less than the width of the fixed trough. This bar is shown as consisting of a T-girder, and its length is somewhat less than that of the trough or channel 12, and the depending hoes thereon are adapted to force the material contained within the same therealong either to the right or to the left, in accordance with the direction of initial movement of said bar, as will hereinafter appear. A power-shaft is represented at 17, extending across the trough and sustained by suitable bearings, and this power-shaft is shown as carrying at one end a suitable driver, shown as a pulley 18, connected by belting with a suitable motor. (Not shown). This shaft also fixedly carries a pinion 19, meshing with the peripheral teeth of a disk or gear 20, fast on the transverse shaft 21. This shaft is sustained by the bearings that carry the main or primary shaft 17, and it is equipped at its opposite end with a fixed disk 22. These disks 20 and 22 are provided upon their outer faces with crank-pins 20' and 22', serving as pivots for the pitmen or connecting-rods 23 and 24, situated at opposite sides of the trough. These pitmen extend forwardly in transverse alinement and have hubs at their extreme forward ends to receive for rotation the opposite ends of the transverse shaft 25. Said connecting-rods have other bearings, shown as located a short distance to the left of their forward ends, to receive the opposite extremities of another transverse shaft 26, which supports at its middle a bracket 27, fastened to the upper side of the body or bar 15.

The connecting-rods 23 and 24 have depending right-angular extensions or arms 28 and 29, to the lower ends of which the longitudinal connecting-rods 30 and 31 are jointed. These connecting-rods are parallel and are situated at opposite sides of the trough or channel 12, and each of them consists of two substantially duplicate sections united at their adjacent ends by turnbuckles 33, by operating which latter accurate adjustment of said connecting-rods may be obtained.

The opposite or extreme right ends of these connecting-rods are jointed to the lower arms or branches of angle-levers 34 and 35 at opposite sides of the trough, said angle-levers receiving at their angles or elbows the opposite ends of the transverse shaft 36, which corresponds with the transverse shaft 25, which, it will be remembered, is supported by the connecting-rods 23 and 24. The upper arms of the angle-levers receive the transverse shaft 37, which corresponds with the shaft 26 and which supports at its middle the bracket 37', corresponding with the bracket 27.

The shafts 25 and 36, which serve similar functions, carry at or near their opposite ends the wheels 39 and 40, two on each shaft, arranged just outside of the trough or channel and adapted to travel on the short tracks 41 and 42, secured to the upper outer sides of the opposite walls of said trough. These wheels are adapted to roll along said tracks as the longitudinal body or bar carrying the hoes is reciprocated, and the wheels serve not only to uphold the said bar, but they reduce friction, serving as thoroughly efficient guides at these points for the body of the reciprocatory feed device.

Referring now to Fig. 2, if the disks 20 and 22 are rotated in the direction indicated by the arrow in this figure the body 15 will be first lowered through the intermediate connections, then carried forward a short distance, then elevated, then brought rearward to its initial point, this motion being continued so long as said disks are operated, and it will be evident that the body 15, and hence the hoes 16 thereon, move through an elliptical path, so that as said hoes enter the material and as they move along the trough 12 they advance such material, which may be received from the chute 13 for delivery to the hopper 14. With the parts in the position represented in said Fig. 2 and if the motion just set forth be reversed the substance within the trough will be fed toward the left.

The invention is not limited to the construction hereinbefore described, for many changes may be adopted within the scope of the appended claims.

In Fig. 4 is shown a modified construction, wherein the wheels 39 and 40 and the guides 41 and 42 for carrying shafts 25 and 36, as shown in Figs. 1 and 2, are superceded by swinging rocker-arms 39 and 40. These rocker-arms are mounted on shafts 50 and 51, carried on pillow-blocks 52, which may be mounted either on the lower side of the trough or on the foundation or structure supporting the trough. The rocker-arms 39 and 40 receive at their upper ends the cross-shafts 25 and 36, the shaft 25 carrying the end of the connecting-rod 23, which supports the cross-shaft 26, from which the bar 15 is supported in the way already described by box 27. The shaft 36, mounted on rocker-arms 40, carries the bell-cranks 35, one end of which carries shaft 37, from which the bar 15 is supported by the bracket 27'. The rectangular extension of the connecting-rods 28 are connected, respectively, to the one arm of the bell-cranks 35 by rods 30, the same as hereinbefore described. The connecting-rods are also carried on the disks 20 and 22, mounted on shafts 21 by the pins 21', and it will therefore appear that as the cranks 21' rotate around their axles the upper end of the rocker-arms 39 and 40 will have a radial reciprocating motion imparted to them and that the bar 15, connecting the hoes, will have a similar motion imparted to it and by reason of the rectangular extension of the connecting-rods and the bell-cranks 35 will at the same time have a vertical motion proportionate to the throw of the bell-cranks. From this it will appear that the hoes fastened to the bar 15 will have a modified elliptical movement as the crank revolves, accomplishing the same results as in Figs. 1 and 2, with the exception that the path of movement of the hoes is slightly modified.

Other changes may be adopted. For example, I might with advantage dispense with one of the connecting-rods 23 or 24. In this case, however, the disposition of the parts would be slightly changed.

Having described the invention, I claim—

1. In a conveyer, a body having hoes, shafts carried by said body, a rod connected to one of the shafts, said rod having an angular projection, an angle-lever an arm of which is connected to the other shaft, a connection between the other arm of the angle-lever and said angular projection, and means for reciprocating said rod.

2. In a conveyer, a feeding member, shafts carried by said member, a rod connected to one of the shafts, said rod having an angular projection, an angle-lever an arm of which is connected to the other shaft, a connection between the other arm of the angle-lever and said angular projection, and a wheel having a crank connected with said rod.

3. In a conveyer, a body having hoes, supports connected with said body at different points in its length, means for causing said supports to traverse corresponding orbital paths, said means including a plurality of wheels movable solely in a corresponding horizontal plane and means for supporting said wheels.

4. In a conveyer, a body having hoes, supports connected with said body at different points in its length, means for causing said supports to traverse corresponding orbital paths, said means including a plurality of wheels movable in a corresponding horizontal plane, a trough to receive said hoes and horizontal tracks upon the trough constituting the sole supporting means for said wheels.

5. A conveyer, including a body having hoes, an operating device, a rod connected with said operating device, a shaft connected with said rod and with said body, a lever operatively connected with said connecting-rod, a plurality of shafts connected respectively with said connecting-rod and lever, a shaft supported by the lever and connected with said body, and guiding means for said plurality of shafts.

6. A conveyer, including a body having hoes, an operating device, a rod connected with said operating device, a shaft connected with said rod, a lever, a connecting-rod jointed respectively to said first-mentioned rod and to said lever and consisting of two parts, a turnbuckle uniting said parts of said connecting-rod, a plurality of shafts connected respectively with said first-mentioned connecting-rod and lever, guiding means for said plurality of shafts, and a shaft supported by said lever and connected with said body.

7. In a conveyer, a pair of disks, a body having hoes, connecting-rods jointed to said disks and having right-angular arms, a shaft connected with said connecting-rod, guiding means connected with said shaft, a shaft supported by said connecting-rods and supporting said body, angle-levers, a shaft supported by said angle-levers and having guiding means, a shaft connected with said angle-levers and supporting said body, and connecting-rods uniting the other connecting-rods and said angle-levers.

In testimony whereof I have hereunto set my hand in presence of two subscribing witnesses.

JOHN ROGER.

Witnesses:
ALFRED DUNN,
H. P. SAUNDERS.